Aug. 12, 1969  A. A. SHOUDY, JR  3,460,236
METHOD OF MAKING NUCLEAR REACTOR FUEL ELEMENTS
Filed April 20, 1967  2 Sheets-Sheet 1
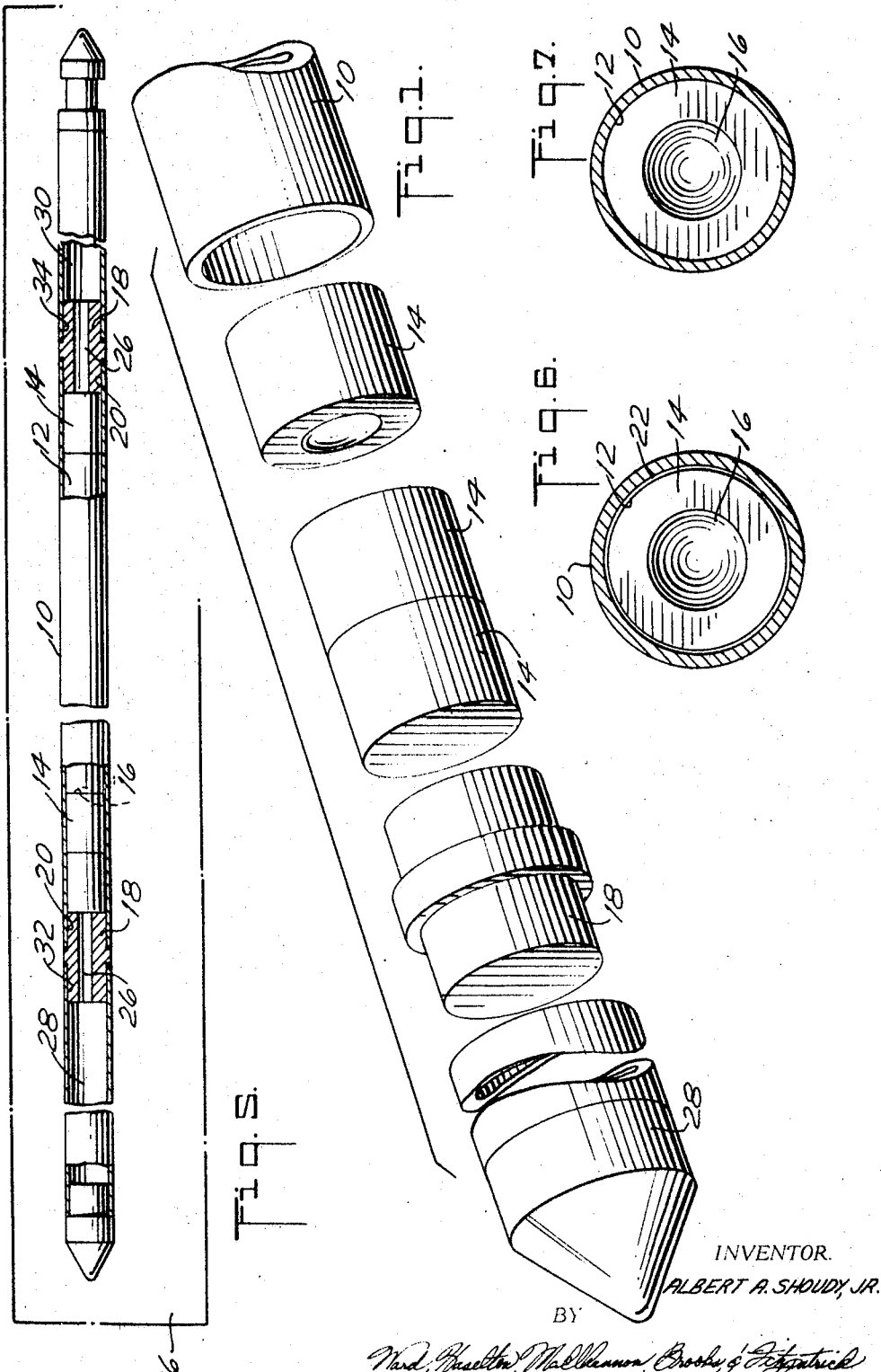
INVENTOR.
ALBERT A. SHOUDY, JR.
BY
ATTORNEYS

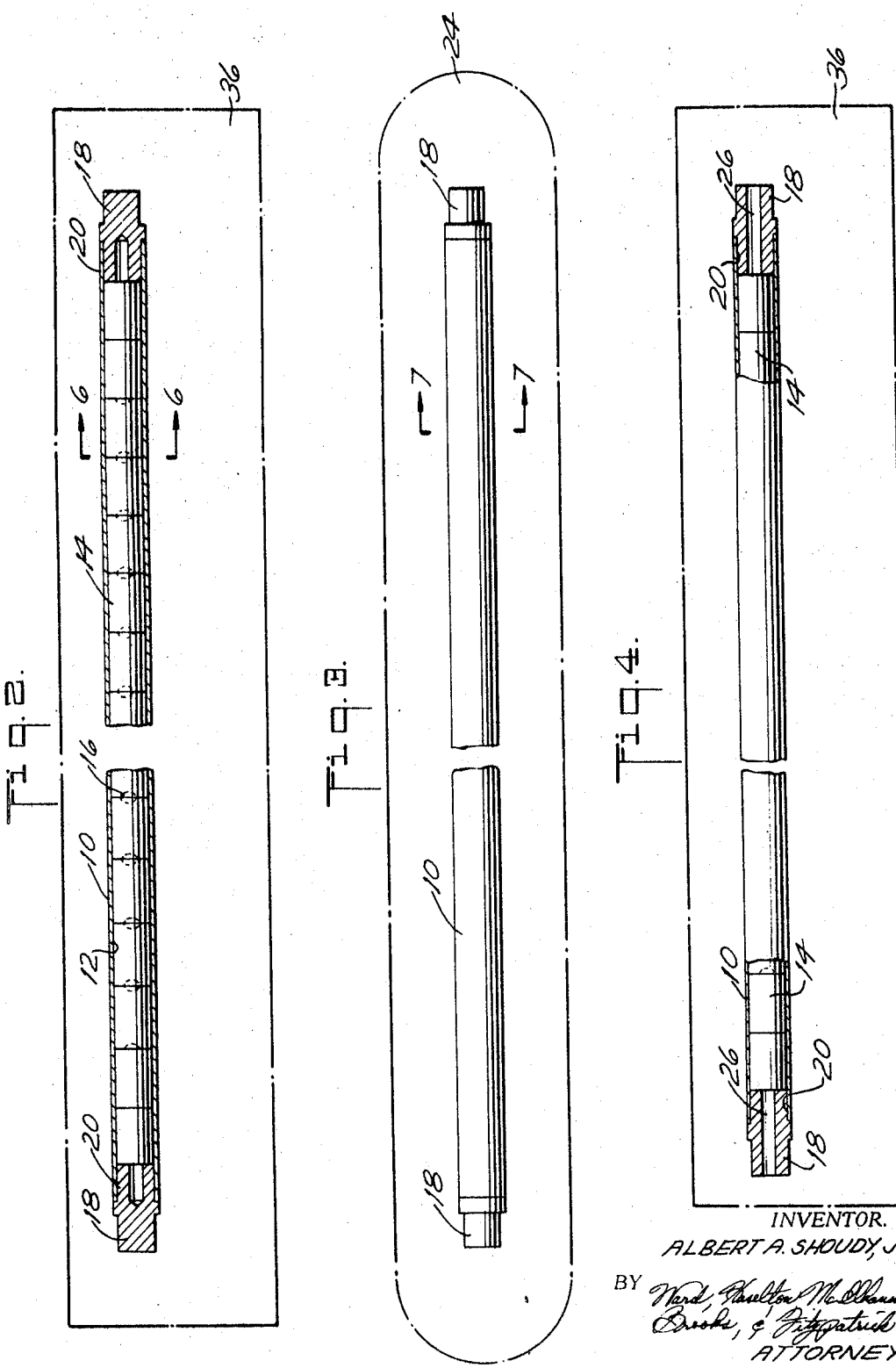

United States Patent Office 3,460,236
Patented Aug. 12, 1969

3,460,236
METHOD OF MAKING NUCLEAR REACTOR
FUEL ELEMENTS
Albert A. Shoudy, Jr., Royal Oak, Mich., assignor to
Atomic Power Development Associates, Inc., Detroit,
Mich., a corporation of New York
Filed Apr. 20, 1967, Ser. No. 632,296
Int. Cl. G21c 21/02
U.S. Cl. 29—471.1                 10 Claims

ABSTRACT OF THE DISCLOSURE

A method of fabricating a nuclear fuel element including the steps of filling a tube with fissionable fuel material, securing end closures to the ends thereof in sealed relationship with respect thereto, creep collapsing the tube onto the fuel material, making a hole in at least one of the end closures and attaching an axial fission gas plenum to that end closure.

---

This invention relates to nuclear reactors, and more particularly, to fuel elements therefor.

Essentially, a nuclear reactor controls the energy released in fission by nuclear fuels, and a coolant is circulated through the reactor to carry away the heat and limit the maximum operating temperature. The nuclear fuel employed may be in a solid, liquid, or slurry mixture state, and it is concentrated in the reactor core.

This invention has to do with fuel elements in a solid form and, more particularly, to one which releases a high percentage of fission gas. The invention is particularly adapted for use with ceramic oxide fuels, or the like.

Heretofore, ceramic type nuclear reactor fuel has been used in the form of sintered pellets or cast slugs that are sodium or gas bonded to a metallic clad which is usually in the form of an elongated cylindrical tube which may be of stainless steel, zircalloy, zirconium, niobium or yttrium, for example. For use in fast-nuclear reactors the diameter of the material of such fuel elements is normally of the order of about 0.25 inch. At the high power density range required to achieve economic fuel cycle costs, the fuel is subjected to extremely high temperatures, and is prone to crack and possibly move within the metallic tubing. Under such conditions, axial voidage may be introduced into the fuel column. During reactor operations, such axial voidage provides a positive reactivity insertion if the fuel should slump due to either a mechanical or thermal shock. This type of fuel movement is of particular significance in a fast reactor where very small amounts of fuel compaction greatly increases reactivity.

In order to minimize the likelihood of the occurrence of such an accident, it has been proposed to collapse or tighten the metallic cladding onto the fuel pellets or slugs so that the fuel is rigidly held in place. In such an assembly the cladding assists in supporting the fuel material. Further, with a gas bonded fuel element, a tight clad is advantageous for reducing the thermal resistance of the fuel-clad gas gap. Various mechanical methods have been proposed for fabricating this type of fuel element, but they have not been entirely satisfactory for many reasons. In some instances the fuel column has been elongated during the working operation, and in other cases the fuel itself has been cracked or fractured, particularly when using low density fuel pellets. Also, it has been proposed to tighten the metallic cladding onto the fuel material under high temperature and high pressure conditions by means of creep collapsing the cladding. Although this method achieves the desired result without the disadvantages of elongating the fuel column height or destroying the fuel pellets, it has the disadvantage that when the fuel element is designed to accommodate fission gas, the fission gas plenum is also collapsed. Still other attempts have been made to solve this problem by providing a thicker walled gas plenum, but this takes up additional space in the heart of the nuclear reactor core which is at a particular premium.

A feature of the present invention resides in the provision of a new and improved method of fabricating a nuclear fuel element which overcomes the difficulties and disadvantages of the prior art fuel elements. In brief, the present invention comprises the provision of a method of fabricating a nuclear fuel element which includes the steps of taking an elongated cladding tube having at least one open end and filling the tube with fissionable fuel material. An end closure is then secured to the open end of the tube in sealed relationship therewith. Thereafter, the cladding tube is creep collapsed onto the fuel material, by means of the application of heat and pressure. Then a hole is drilled or bored into the end closure, and an axially extending fission gas plenum is attached thereto. In one form of the invention sufficient heat is applied to the cladding tube during the creep collapsing step that the cladding material is actually heat-treated, thereby preventing sodium corrosion of the cladding during normal operation of the fuel elements.

Another feature of the invention resides in the provision of a method of fabricating a nuclear fuel element which is far superior to existing methods, which is simple and practical, which is economical and which is otherwise well suited for its intended purpose.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis of the designing of other structures for carrying out the purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings forming a part of the specification, wherein:

FIG. 1 is an enlarged exploded perspective view of the end portion of a fuel element constructed in accordance with the concept of this invention;

FIGS. 2–5 inclusive are a series of side elevational views, partially in longitudinal section, showing a series of steps in the method of fabricating a fuel element according to the invention;

FIG. 6 is an enlarged sectional view taken along the lines 6—6 of FIG. 2; and

FIG. 7 is an enlarged sectional view taken along the lines 7—7 of FIG. 3 showing the interrelationship of the fuel material and the cladding after collapsing the cladding.

According to the invention, an elongated cladding tube 10, FIG. 2, having an inner surface 12 is fabricated from any suitable material such as stainless steel, for example. As best seen in FIG. 2, the cladding tube 10 is filled with fissionable fuel material which may be in the form of oxide pellets 14. A small space 16 between the pellets is provided for axial expansion of the fuel material during operation of the reactor. Thereafter, in the fabrication of the fuel element, end closures, such as end plugs 18, FIG. 2, are fusion welded to each end of the tube in sealed relationship with respect thereto as at 20. Preferably, the end plugs are fabricated from the same material as the cladding tube, such as stainless steel, for example. It is particularly noted that at this stage of the fabrication process there is a gap 22 between the fuel material 14 and the inside surface 12 of the cladding tube 10, as best seen in FIG. 6.

Then the so-assembled fuel element is positioned in an autoclave 24, FIG. 3, for creep collapsing the cladding onto the fuel material by means of the application of heat and pressure. When the fuel pin is about ¼" in diameter, the cladding is about 16 mils thick, and the cladding material is stainless steel, such as type 304, then the assembly is subjected to a temperature of about 800° C. and a pressure of about 200 p.s.i. for a period of time of between about 8 and about 24 hours to creep collapse the cladding tube until the fuel material is in tight contact with the surface 12 of the cladding tube 10, as best seen in FIG. 7. The pressure and temperature are important so that the cladding tube will uniformly collapse onto the fuel material and no ripples or wrinkles will be formed.

It will be appreciated that it is desirable to have the cladding tightly engage the fuel material so that it will assist in the support cladding of the fuel and prevent slumping. Moreover, subjecting the stainless steel to a temperature of about 800° C. for a period of from about 8 hours to about 24 hours is sufficient time to sensitize the stainless steel, and thus improve its resistance to intergranular corrosion by the sodium during normal operation of the reactor. This high temperature sensitization results in a formation of a non-continuous carbide percipitate at the grain boundaries as compared with a continuous percipitate that would form from normal operating temperature conditions in the reactor.

Thereafter, the next step is to drill longitudinal holes 26 of the order of about ⅛" diameter in the end plugs 18 at each end of the fuel element as best seen in FIG. 4. The purpose of these holes will be explained more fully hereinafter.

Then the upper and lower axial fission gas plenums 28 and 30 are fusion welded onto the end plugs 18 as at 32 and 34, FIG. 5, respectively. It will be noted that the plenums have a wall thickness substantially the same as the wall thickness of the cladding tube 10, and also, that the outside diameters of the plenums are substantially equal to the outside diameter of the cladding tube wall after the creep collapsing operation. Now, as best seen in FIG. 5, a fission gas plenum is disposed at each end of the fuel element and each plenum is in fluid flow communication with the fuel material 14 disposed inside the cladding tube 10 for accommodating the fission gases formed during normal operation of the reactor.

It will be appreciated that if the fuel material contains plutonium or a plutonium alloy, then the cladding tube is positioned in a glove box 36 for processing in order to prevent plutonium contamination from reaching the room or personnel in attendance. If the fuel material is not a plutonium based material then the glove box 36 may be dispensed with.

From the foregoing description, it will thus be seen that the present invention does indeed contribute a new and improved method of fabricating a nuclear fuel element which simply and effectively provides a superior fuel element.

Although particular embodiments of the invention are herein disclosed for purposes of explanation, various modifications thereof, after study of this specification, will be apparent to those skilled in the art to which the invention pertains, reference should accordingly be had to the appended claims in determining the scope of the invention.

What is claimed and desired to be secured by Letters Patent is:

1. A method of fabricating a nuclear fuel element including an axial fission gas plenum comprising the steps of taking an elongated cladding tube having an open end, filling said tube with fissionable fuel material, securing an end closure to said open end of said tube in sealed relationship with respect thereto, creep collapsing said cladding tube onto said fuel material, making a hole in said end closure, and attaching the axial fission gas plenum to the end closure.

2. The method of fabricating nuclear fuel elements according to claim 1, further comprising the steps of securing an end closure to each end of said tube in sealed relationship with respect thereto, and attaching an axial fission gas plenum to each end closure.

3. A method of fabricating a nuclear fuel element according to claim 1, including the steps of fusion welding said end closure to said cladding tube and fusion welding said axial fission gas plenum to said end closure.

4. A method of fabricating a nuclear fuel element according to claim 1, wherein said creep collapsing step is performed in an autoclave while heating and applying pressure to the cladding tube.

5. A method of fabricating a nuclear fuel element according to claim 4 wherein the cladding tube is heated until it attains a temperature of the order of about 800° C. and wherein the pressure applied is of the order of about 2000 p.s.i.

6. A method of fabricating a nuclear fuel element according to claim 1, wherein said creep collapsing step includes heating and applying pressure to the cladding tube while simultaneously high temperature sensitizing said cladding tube material forming non-continuous carbide percipitate at the grain boundaries, thereby improving said cladding tube material's resistance to intergranular corrosion.

7. A method of fabricating a nuclear fuel element according to claim 6, wherein said cladding tube is fabricated from stainless steel and said creep collapsing and heat-treating step is performed at a temperature of the order of about 800° C.

8. A method of fabricating a nuclear fuel element comprising the steps of taking an elongated cladding tube having an inner surface, filling said tube with fissionable fuel material, securing an end closure to each end of said tube in sealing relationship with respect thereto, creep collapsing said cladding tube until said fuel material is bonded to said inner surface, making a hole in at least one of said end closures, and attaching to said one end closure an axial fission gas plenum having an outside diameter and wall thickness the same as said cladding tube after creep collapsing.

9. A method of fabricating a nuclear fuel element according to claim 8, wherein said fissionable fuel material contains plutonium and all of said steps are performed in a glove box.

10. A method of fabricating a sodium cooled nuclear fuel element comprising the steps of taking an elongated cladding tube having an inner surface, filling said tube with fissionable fuel material, fusion welding an end closure to each end of said tube in sealed relationship with respect thereto, positioning said tube in an autoclave, applying heat at a temperature of the order of about 800° C. and applying pressure of the order of about 2000 p.s.i. for a period of time of the order of between about 8 and about 24 hours for creep collapsing said cladding tube until said fuel material is bonded to the inner surface of said cladding tube and said cladding tube is high temperature sensitized forming non-continuous carbide percipitate at the grain boundaries thereby improving said cladding tube material's resistance to intergranular corrosion by the sodium during normal operation of the reactor, drilling a hole in each of said end closures, and fusion welding to each end closure an axial fission gas plenum having a wall thickness and an outside diameter substantially the same as said cladding after creep collapsing.

References Cited

UNITED STATES PATENTS

| | | | |
|---|---|---|---|
| 3,153,280 | 10/1964 | Jones et al. | 29—473.3 |
| 3,225,437 | 12/1965 | Stohr et al. | 29—473 XR |
| 3,230,152 | 1/1966 | Kerze | 29—473.3 XR |
| 3,406,094 | 10/1968 | Beisswenger et al. | 176—37 XR |

JOHN F. CAMPBELL, Primary Examiner

R. B. LAZARUS, Assistant Examiner

U.S. Cl. X.R.

29—473; 176—68